United States Patent
Pentzien, Sr. et al.

(10) Patent No.: US 9,327,910 B2
(45) Date of Patent: May 3, 2016

(54) MULTI-WIDTH VAPOR STEAM CONVEYOR BELT CLEANER

(71) Applicant: Therma-Kleen, Inc., Plainfield, IL (US)

(72) Inventors: Dwight F. Pentzien, Sr., Crest Hill, IL (US); Gary G. Read, La Fox, IL (US); Lora J. Tryon, Midlothian, IL (US); Ryan D. Pentzien, Crest Hill, IL (US)

(73) Assignee: Therma-Kleen, Inc., Plainfield, IL (US)

( * ) Notice: Subject to any disclaimer, the term of this patent is extended or adjusted under 35 U.S.C. 154(b) by 98 days.

(21) Appl. No.: 14/446,715

(22) Filed: Jul. 30, 2014

(65) Prior Publication Data

US 2015/0053531 A1 Feb. 26, 2015

Related U.S. Application Data

(60) Provisional application No. 61/860,159, filed on Jul. 30, 2013.

(51) Int. Cl.
*B65G 45/22* (2006.01)

(52) U.S. Cl.
CPC ..................... *B65G 45/22* (2013.01)

(58) Field of Classification Search
CPC ...... B65G 25/00; B65G 25/02; B65G 47/145; B65G 67/00; B65G 65/4836; B65G 57/301; B65G 57/10; B65G 56/4683; B65G 49/044; B65G 47/82; B65G 2812/12

USPC .......................................... 198/493, 494, 495
See application file for complete search history.

(56) References Cited

U.S. PATENT DOCUMENTS

| | | |
|---|---|---|
| 3,017,986 A | 1/1962 | Ackles |
| 4,701,242 A | 10/1987 | Scarano et al. |
| 5,706,932 A | 1/1998 | White |
| 6,050,391 A | 4/2000 | Terry |
| 6,254,730 B1 | 7/2001 | Macierewicz |
| 6,401,910 B1 | 6/2002 | Pellini |
| 7,784,476 B2 | 8/2010 | Handy |

*Primary Examiner* — Gene Crawford
*Assistant Examiner* — Lester Rushin
(74) *Attorney, Agent, or Firm* — Paul L. Brown

(57) ABSTRACT

A reciprocating assembly for applying vapor steam to the surface of a multi-width conveyor belt, having a frame to support the belt, to clean and sanitize the conveyor belt, includes, a housing having two ends, with the housing enclosing an endless chain member positioned within the housing and powered by a motor member, with the chain member having a cam member extending outwardly from the endless chain, a reciprocating block member supports a nozzle, with the block member having a cam guide notch structurally arranged to be engaged by the cam member extending from the endless chain member. The housing ends are engageable with vertical housing supports to mount the assembly to the conveyor belt frame to predeterminely control the reciprocating movement of the nozzle between the edges of the conveyor belt.

6 Claims, 8 Drawing Sheets

MULTI-WIDTH VAPOR STEAM CONVEYOR BELT CLEANER

FIELD OF THE INVENTION

The present invention relates to a frame supported carriage assembly for cleaning and sanitizing multiple width food handling conveyor belts utilizing a dry vapor steam nozzle member.

BACKGROUND OF THE INVENTION

In the food handling industry, conveyor belts are utilized in a wide variety of applications. Such applications include the transport of breads, cookies, crackers, chips, and other type snacks through baking ovens to complete the baking process. Other food applications include the transport of meats, poultry, fruits, and vegetables through various treatment stations for cleaning selection and packaging of such foods. The conveyor belts utilized in food applications primarily includes synthetic/plastic conveyor belts. These belts accumulate build-up of food particles during usage which require cleaning and sanitization after each processing step. Also, such conveyor systems require cleaning to prevent ingredient contamination from one type of food product to another type of baked product.

Several methods and processes have been utilized to attempt to provide clean conveyor belts. One method utilizes the manual spraying of water to clean and remove debris from the conveyor. However, such a method is labor intensive, provides uneven cleaned conveyor surfaces and requires excessive amounts of water. Accordingly, such a cleaning process is of limited value in cleaning food processing conveyor belts.

Other methods of cleaning food conveyor belts utilize a washing method which includes rotating brushes and/or scraper members to engage the conveyor belt, with subsequent washing and/or vacuuming to facilitate removal and cleaning of the conveyor belt. Again, such cleaning methods are labor and time intensive and require excessive amounts of water and cleaning chemicals to accomplish the desired cleaning of the conveyor belt.

Still another cleaning method utilizes a customized housing assembly designed to engage a specific width of conveyor belt to clean the same. Such systems include dry steam vapor blasts that loosen the debris from the belt. However, such a method requires the use of a powerful vacuum to remove the debris and dry the conveyor belt before further usage of the belt. Therefore, such a method is labor and time intensive, and because each customized housing assembly is only designed to clean a specific width conveyor belt, a plurality of expensive assemblies are required in food processing facilities that include multiple width conveyor belts; thus, such a method is expensive and cost ineffective.

SUMMARY OF THE INVENTION

It is an object of the present invention to provide a frame supported carriage assembly structurally arranged for cleaning and sanitizing multiple width food conveyor belts utilizing a water/steam spray nozzle transversing back and forth between the edges of the belt to engage and clean the belt surface.

It is a further object to provide a single frame supported carriage assembly which is structurally mounted to clean and sanitize a multiple-width of conveyor belts ranging between one and five feet in width.

It is another object of the present invention to provide a water/steam spray nozzle assembly which is height adjustable with respect to the conveyor belt surface to provide optimum cleaning action and sanitizing performance of the conveyor belt.

It is still a further object of the present invention to provide a single width frame supported carriage assembly to direct a water/steam spray nozzle across the full width of the conveyor belt.

It is yet another object of the present invention to provide a water/steam spray assembly that provides optimum cleaning action and sanitizing performance without the need or requirement of a powerful vacuum to complete the cleaning action.

The present invention includes a frame supported carriage assembly which includes a reciprocator/nozzle block member, having a cam guide notch which is structurally arranged to engage a cam member extending outwardly from the chain drive within the carriage assembly. The chain drive is mounted within the carriage assembly as a continuous chain member which is driven by a motor coupled to an end sprocket or gear. The frame supported carriage assembly is mounted to the frame support of the conveyor belt to position the reciprocator/nozzle relative to the conveyor belt surface.

The reciprocating nozzle block member is attached via a flexible hose to a dry vapor steam source to direct the vapor steam onto the conveyor belt to clean and sanitize the belt. The reciprocating nozzle block member is height adjustable relative to the conveyor belt surface to provide optimum cleaning and sanitizing after the nozzle transverse back and forth between the edges of the conveyor belt.

The frame supported carriage assembly is of such a length and dimension that when the carriage assembly and the reciprocating nozzle is positioned to clean and sanitize a conveyor belt, the carriage assembly is capable of fully engaging and cleaning conveyor belts having a width of between one foot and five feet. Accordingly, the present invention is a single machine having a carriage assembly which is structurally arranged to be precisely positioned over a conveyor belt to permit the nozzle to only engage and clean the entire width of the conveyor belt during each transverse back and forth across the conveyor belt.

Finally, a method of steam cleaning and sanitizing multi-width conveyor belts utilizing a single width vapor steam cleaner assembly includes the steps of mounting one end of the vapor-steam cleaner assembly to the conveyor belt frame, securing the other end of the frame supported carriage assembly to the opposite conveyor belt frame, and reciprocating the nozzle directed vapor steam back and forth between the edges of the conveyor belt to clean and sanitize the belt.

The present invention consists of certain novel features and structural details herein after fully described and illustrated in the accompanying drawings, and specifically pointed out in the appended claims, it being understood that various changes in the details may be made without departing from the spirit or sacrificing any of the advantages of the present invention.

DESCRIPTION OF THE DRAWINGS

The foregoing description, and other characteristics, objects, features and advantages of the present invention will become more apparent upon consideration of the following detailed description, having references to the accompanying drawings, wherein.

DETAILED DESCRIPTION OF THE INVENTION

Figure 1:
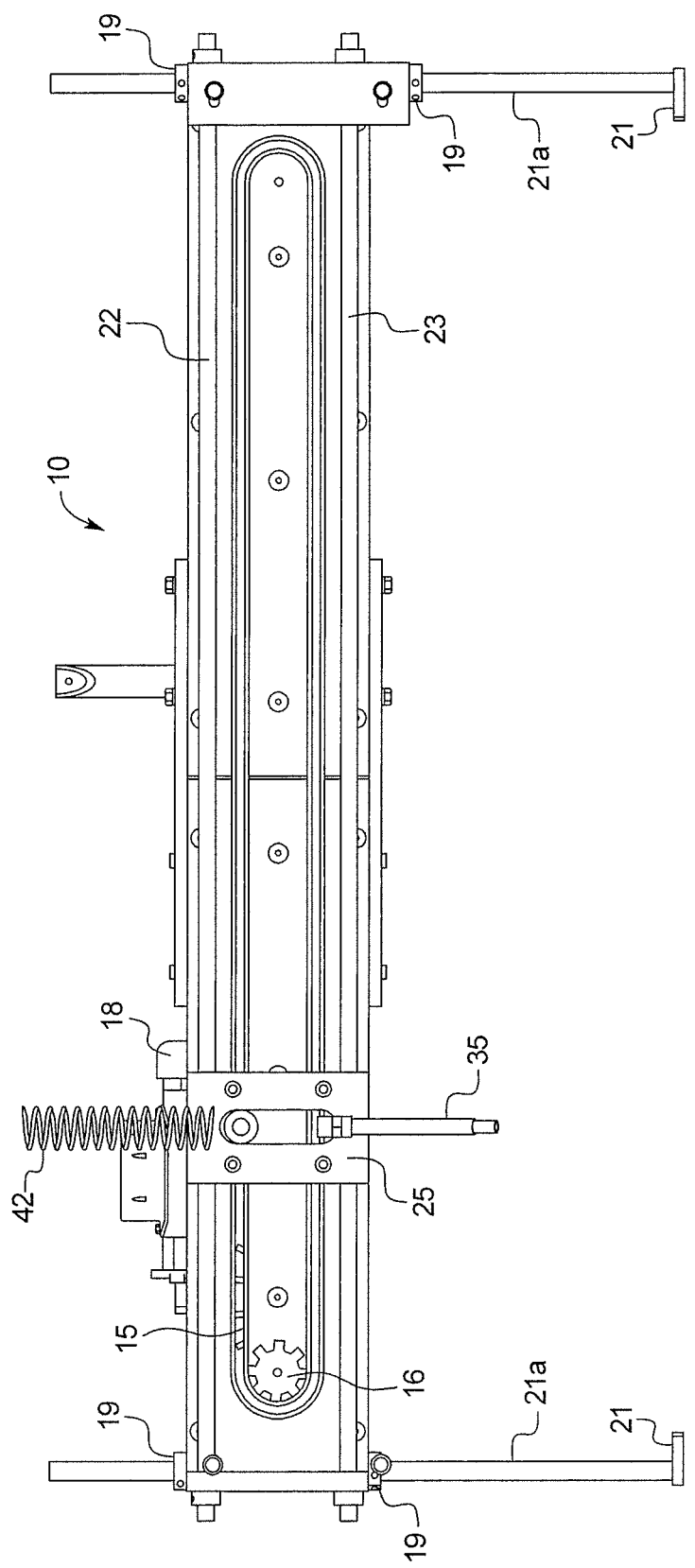
FIG. 1 is a side view of one embodiment of the frame supported carriage assembly for steam cleaning and sanitizing multiple width food handling conveyor belts in accordance with the present invention.
Figure 2:
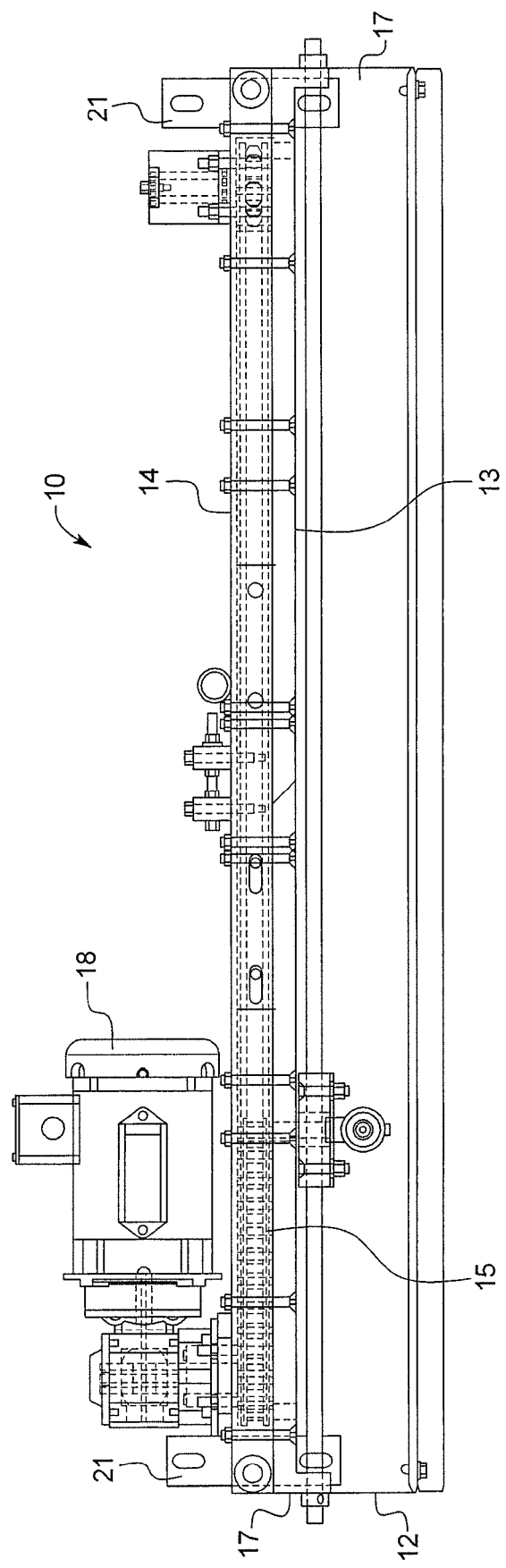
FIG. 2 is a top plan view of the frame supported carriage assembly shown in FIG. 1 in accordance with the present invention.

Referring now to the drawings wherein like numerals have been used throughout the several views to designate the same or similar parts, there is illustrated in FIG. 1 a side view of the frame supported steam cleaner carriage assembly 10 for cleaning and sanitizing multiple width food handling conveyor belts 20 in accordance with the present invention. The conveyor belts 20 are preferably comprised of polymers and copolymers of vinyl plastic derivatives. As shown in FIG. 2, the frame supported carriage assembly 10 includes a housing 12, having a housing front wall 13 and a housing back wall 14. Within the housing 12, an endless chain member 15 is mounted to rotate about aligned sprockets 16 positioned substantially adjacent the ends 17 of the housing 12. One of the sprockets 16 is driven and coupled to a motor 18 for rotating the sprocket 16 and endless chain member 15, as is known in the art. Preferably, the housing includes a guard panel 29 to protect the user from the moving parts of the assembly.

Figure 3:
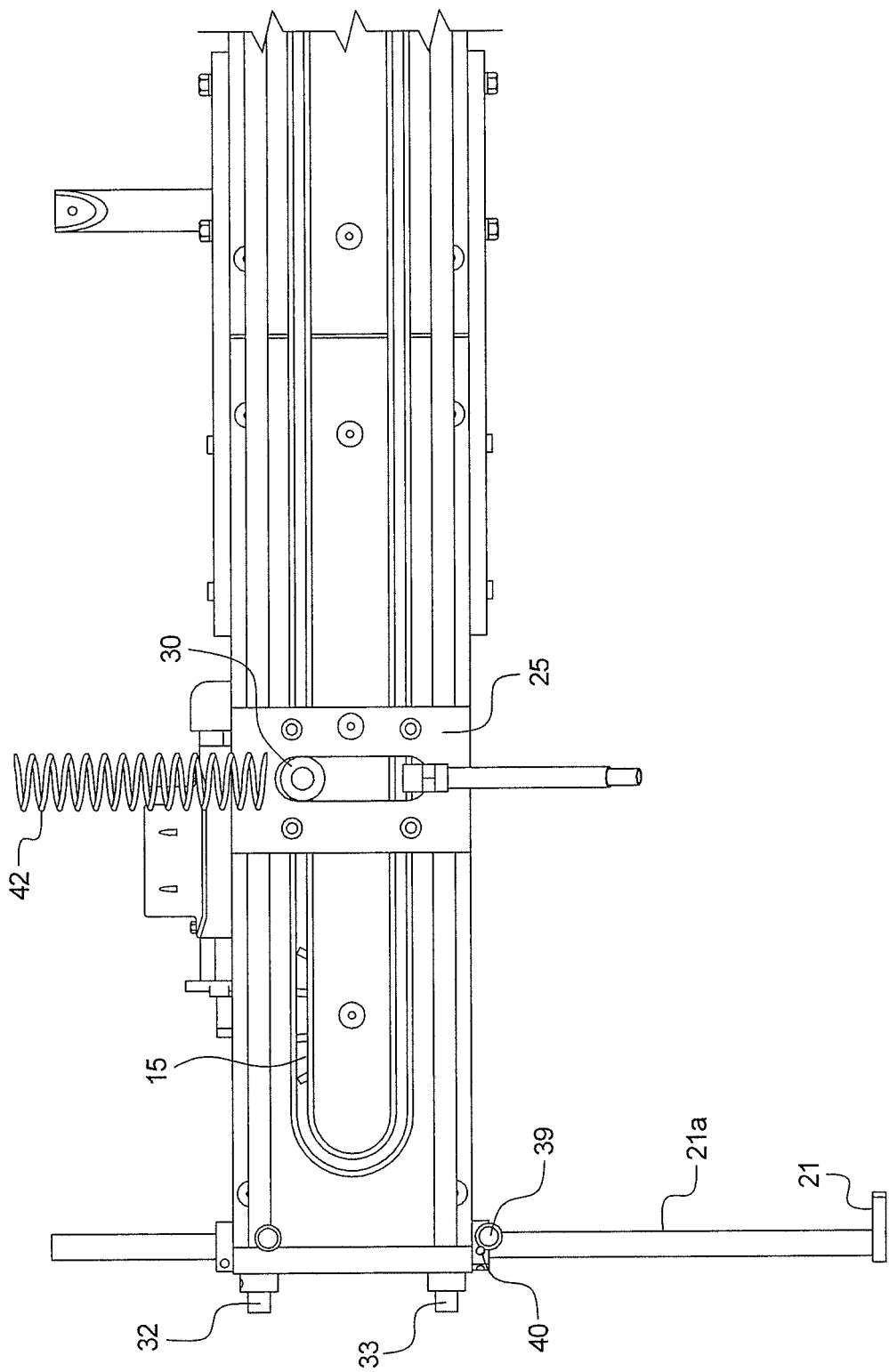
FIG. 3 is an enlarged, partial cross-sectional view illustrating the reciprocating nozzle block member engaged with the cam member extending from the chain and moving in the direction of the arrow in accordance with the present invention.
Figure 4:
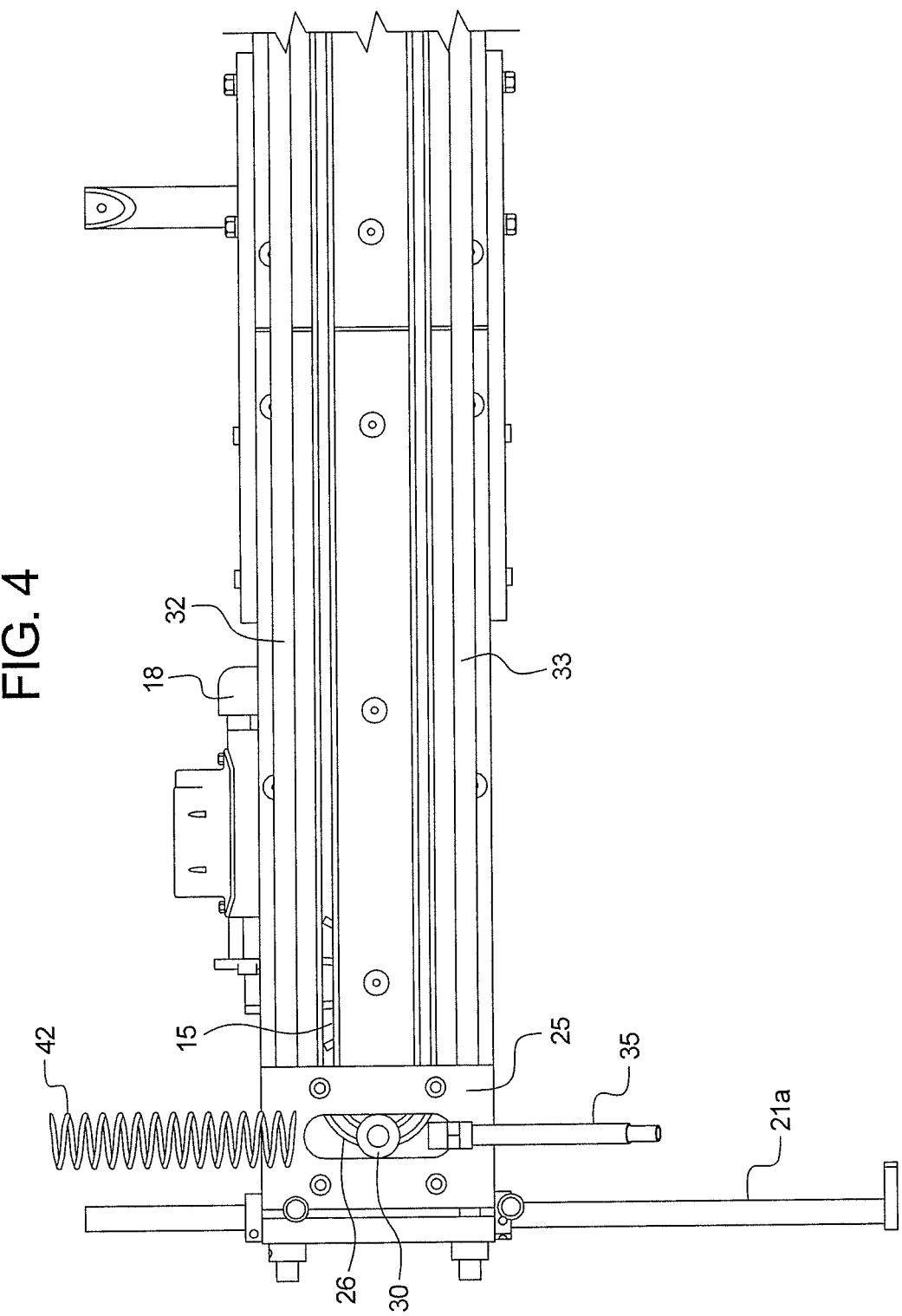
FIG. 4 is an enlarged, partial cross-sectioned view illustrating the end position of the chain cam member within the nozzle block member in accordance with the present invention.
Figure 5:
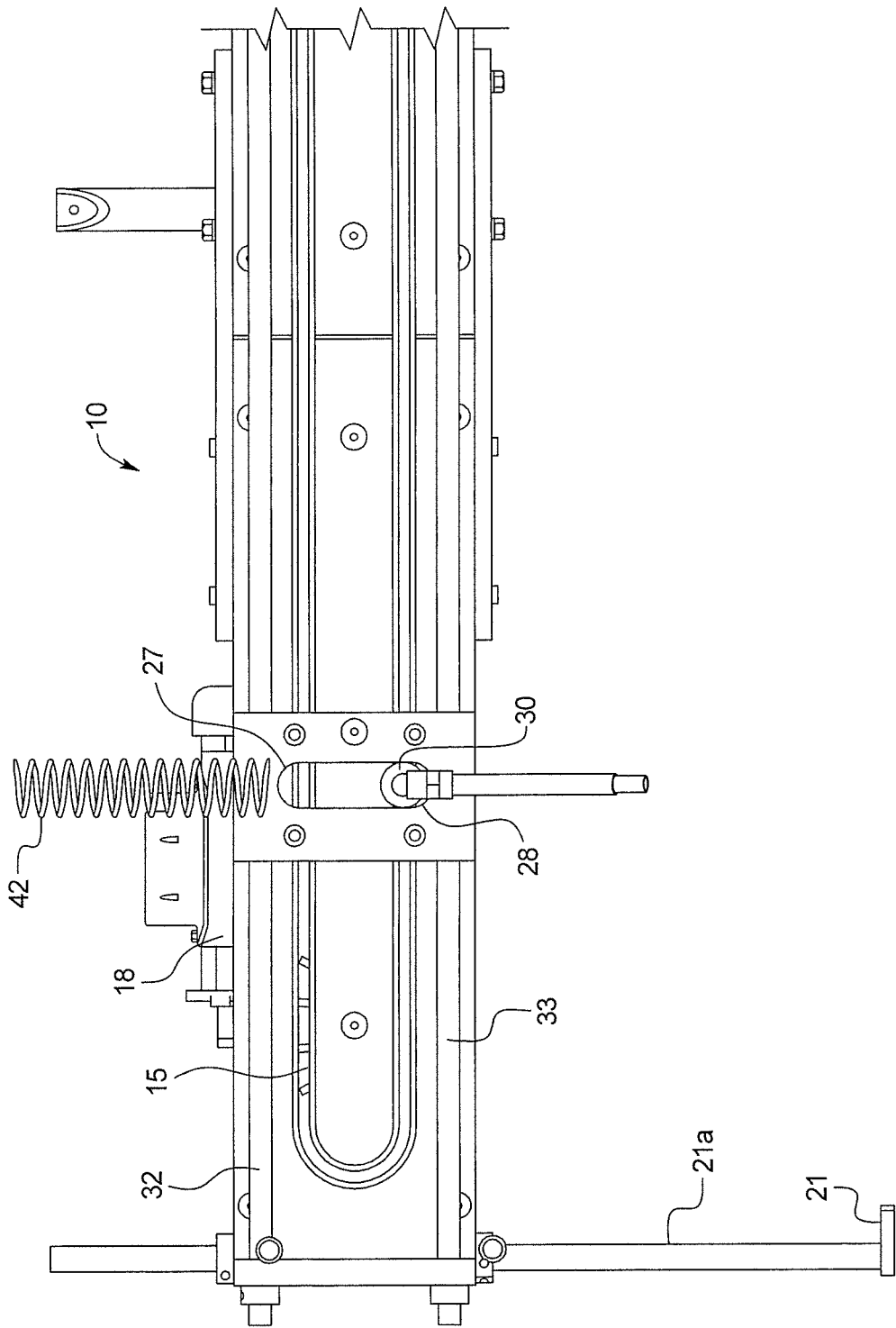
FIG. 5 is an enlarged cross-sectioned view illustrating the return travel of the nozzle block member in the direction of the arrow in accordance with the present invention.
Figure 6:
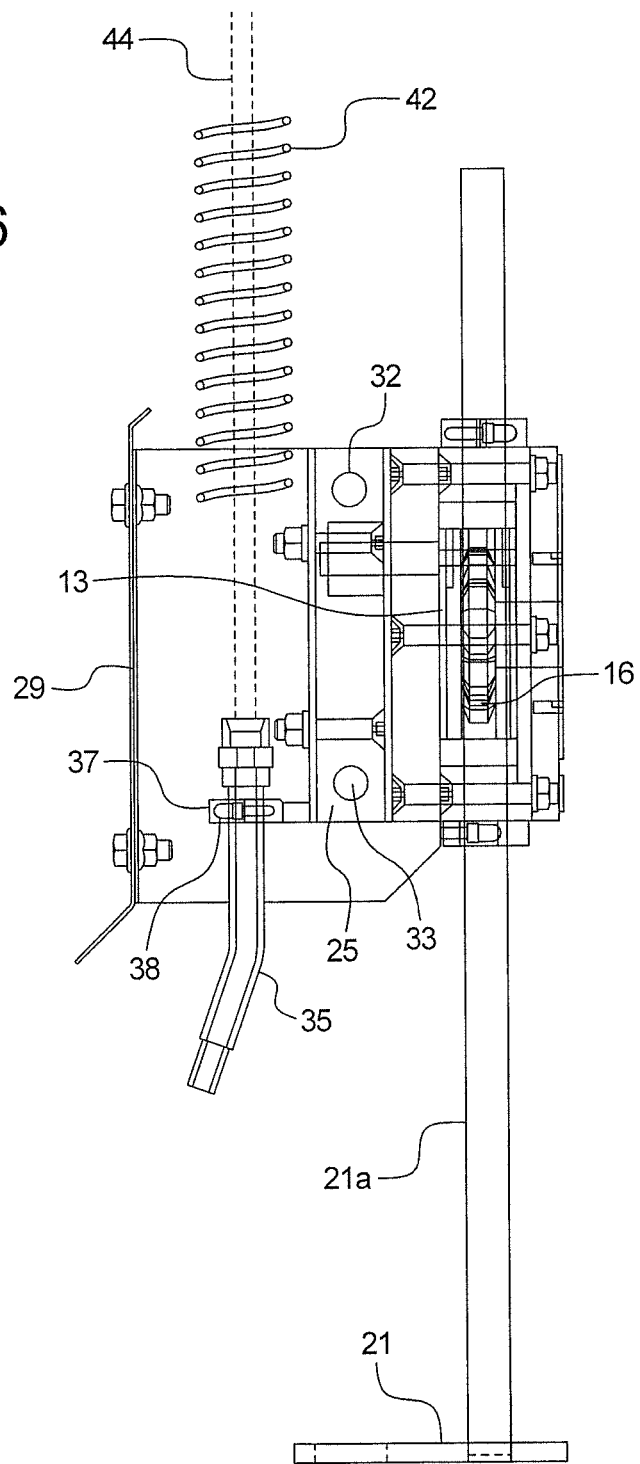
FIG. 6 is a frontal view of the cam block member in accordance with the present invention.
Figure 7:
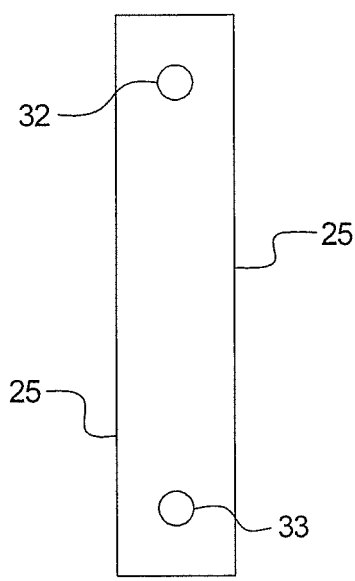
FIG. 7 is a side view of the cam block member in accordance with the present invention.
Figure 8:
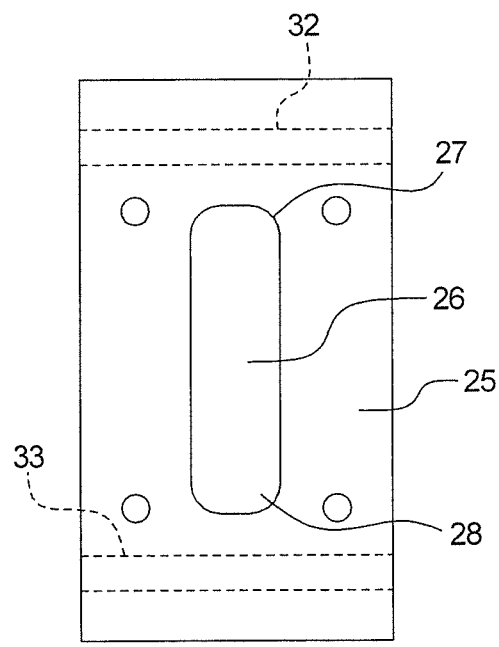
FIG. 8 is a sectional view of FIG. 1 taken lines 8-8.
Figure 9:
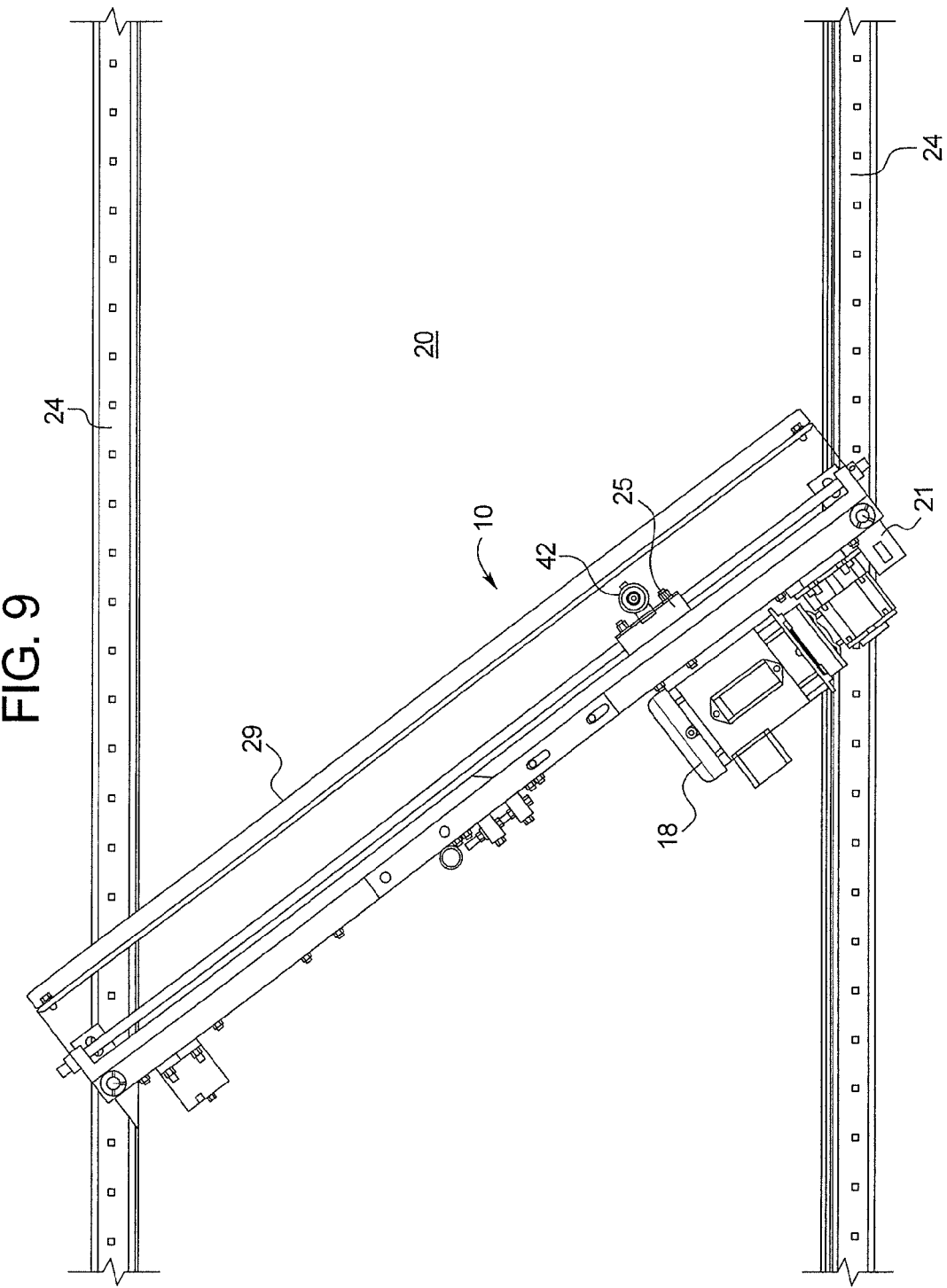
FIG. 9 is a top view illustrating the diagonal mounting of the frame supported carriage assembly to the conveyor belt supporting frame in accordance with the present invention.

Slidably mounted to the ends 17 of the carriage assembly 10 are support members 21 and 21a which may be structurally arranged to support the assembly 10 relative to the conveyor belt 20 surface. Thus, the assembly 10 may be mounted relative to the conveyor belt by having the support members 21 and 21a supported by the floor upon which the conveyor belt is operative or by mounting the conveyor belt frame 24 as shown in FIG. 9. Mounted to the ends 17 of the carriage housing 12 are a pair of stainless steel guide shafts 22, 23 upon which the reciprocator nozzle block member 25 is slidably mounted, as will hereinafter described. The block member 25 is shown in FIGS. 7 and 8 and includes a cam guide notch 26 which is structurally arranged to receive a cam member 30 secured to the endless chain member 15 and which extends out broadly to be received in the cam guide notch. As shown in FIG. 3, the cam member 30 engages the upper end 27 of the cam guide notch when the chain member is rotating in the direction of arrow A. When the reciprocator block member 25 is moved to the housing end 17, the cam member 30 is positioned substantially intermediately between the upper end 27 and lower end 28 of the cam guide notch 26, as shown in FIG. 4. Finally, when the cam member 30 engages the lower end 28 of the cam guide, the reciprocator block member 25 is moved in the direction of arrow B, as shown in FIG. 5.

As shown in FIGS. 7 and 8, the reciprocator block member 25 includes a pair of bores 32, 33 therein which are structurally arranged to respectively receive guide shafts 22, 23, mounted to the housing ends 17. Such an assembly permits the block member to reciprocate back and forth between the housing ends 17 upon the guide shafts 22, 23.

The reciprocator block member 25 is preferably comprised of an abrasion resistant glass filled ultra high molecular polyethylene. Such a composite provides excellent resistant to wear and substantially resistant-free contact between the reciprocating block member and the guide shafts 22 and 23. As illustrated in FIG. 1, a nozzle 35 is secured to the reciprocator block member 25 for directing the water/steam spray onto the conveyor belt 20. The nozzle 35 is height adjustable by either adjustably securing the nozzle by the use of an adjustment screw member 37 cooperating with a collar secured to the block member 25 or by adjustably securing the housing ends 17 of the assembly housing 12 to vertical housing supports 19 utilizing a collar 40 and adjustment screw member 39. Either of the these adjustment assemblies permit the precise positioning of the nozzle relative to the conveyor belt surface, preferably between ½ inch to 2 inches, to provide for optimum cleaning action of the conveyor belt. As depicted in the drawings, a flexible spring 42 is secured to the block member to maintain and support the dry/steam supply hose 44 coupled to the nozzle 35 during the reciprocation movement of the nozzle back and forth between the conveyor belt edges to clean and sanitize the conveyor belt. Such a structure provides the efficient cleaning and sanitation of the conveyor belt without using excessive amounts of dry steam vapor.

Additionally, the unique steam cleaner assembly of the present invention is of such a width to precisely control the amount of dry steam vapor that is directed onto the surface of the conveyor belt. The cleaner assembly is capable of cleaning and sanitizing conveyor belts having a width of between one foot and five feet and, preferably, belts having a width between 1½ feet and 4 feet.

As shown in FIG. 9, the steam cleaner assembly 10 is diagonally mounted to the conveyor belt frame 24 to precisely position the assembly 10 over a conveyor belt 20 that has a width less than the width of the carriage assembly. When the dimensions of the conveyor belt 20 are the same as the width of the carriage assembly 10, then the assembly would be perpendicularly mounted in relation to the conveyor belt 20 and frame 24. This structure of the carriage assembly permits the carriage assembly to precisely clean and sanitize a variety of widths of conveyor belts without any reduction in the cleaning efficiency of the assembly.

The dry steam vapor assembly of the present invention provides novel methods of utilizing a single width assembly to efficiently clean and sanitize multiple width conveyor belts. Preferably, the methods include the steps of mounting one end of the steam vapor assembly to one of the conveyor belt side support frames, securing the other end of the steam vapor assembly to the other conveyor belt side support frame, and reciprocating the nozzle and block member back and forth between the edges of the conveyor belt to clean and sanitize the belt. However, it is within the scope of the present invention to mount the assembly 10 directly to the floor of the bakery to position the assembly relative to the conveyor belt 20 surface. In such a case, the support members 21a would be of such a length to precisely position the reciprocating nozzle 35 relative to the conveyor belt surface. Such methods eliminate the requirement of physically scraping or brushing the conveyor belt or vacuuming the belt to remove debris, and substantially reduce the amount of water used in cleaning a conveyor belt. Also, the methods eliminate the need of expensive chemicals to sanitize the belt, and eliminate the requirement of the prior art cleaning assemblies of requiring individual units for each width conveyor belt.

The invention claimed is:

1. A reciprocating assembly for applying vapor steam only to the surface of a multi-width conveyor belt having a frame to support the belt, to clean and sanitize the same, includes in combination:
- a housing having two ends, with said housing enclosing an endless chain member within said housing and driven by a motor member, with said chain member having a cam member extending therefrom; and
- a reciprocating block member having a nozzle secured thereto, with said block member having a cam guide notch therein structurally arranged to be engaged by said cam member extending from said endless chain member;
- wherein said housing ends are engageable with vertical housing supports to mount the reciprocating assembly to the multi-width conveyor belt frame to predeterminely control the back and forth reciprocating movement of the nozzle between the edges of the conveyor belt.

2. The reciprocating assembly in accordance with claim 1 wherein said conveyor belt is between 1.5 to 5 feet in width.

3. The reciprocating assembly in accordance with claim 1 wherein said nozzle is adjustably to be positioned between 0.5 to 2 inches from said surface of said conveyor belt.

4. The reciprocating assembly of claim 1 wherein said assembly is comprised of stainless steel.

5. The reciprocating assembly of claim 3 wherein said adjustable position of said nozzle in relation to said conveyor belt surface is obtained by adjustably securing said housing ends to said vertical housing supports.

6. A method of efficiently cleaning and sanitizing multiple-width conveyor belts having side support frames, using a steam vapor nozzle assembly, including the steps of:
- mounting one end of a said steam vapor assembly to one of said side support frames;
- securing the other end of said steam vapor assembly to the other side support frame of said conveyor belt; and
- reciprocating said steam vapor nozzle assembly back and forth between the edges of the conveyor belt to engage the surface of said belt to clean and sanitize the same.

* * * * *